United States Patent
Pugsley et al.

(10) Patent No.: US 8,782,309 B2
(45) Date of Patent: Jul. 15, 2014

(54) METHOD AND APPARATUS FOR SUGGESTING DATA FOR DELETION

(75) Inventors: Craig Pugsley, Paignton (GB); Jesmond Allen, Bristol (GB)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 440 days.

(21) Appl. No.: 12/631,684

(22) Filed: Dec. 4, 2009

(65) Prior Publication Data

US 2011/0134738 A1    Jun. 9, 2011

(51) Int. Cl.
*G06F 13/12* (2006.01)

(52) U.S. Cl.
USPC ............................................................ 710/74

(58) Field of Classification Search
USPC ........................................................... 710/15
See application file for complete search history.

(56) References Cited

U.S. PATENT DOCUMENTS

| | | | |
|---|---|---|---|
| 5,652,613 A * | 7/1997 | Lazarus et al. | 725/50 |
| 5,774,657 A * | 6/1998 | Okamura et al. | 709/230 |
| 7,092,702 B2 * | 8/2006 | Cronin et al. | 455/418 |
| 2004/0062523 A1 | 4/2004 | Iida | |
| 2005/0050578 A1 | 3/2005 | Ryal | |
| 2005/0060281 A1 | 3/2005 | Bucher et al. | |
| 2008/0002951 A1 * | 1/2008 | Russ et al. | 386/124 |
| 2008/0294693 A1 | 11/2008 | Hayashi | |
| 2010/0064314 A1 * | 3/2010 | Li et al. | 725/38 |

FOREIGN PATENT DOCUMENTS

| WO | WO 02/14990 A1 | 2/2002 |
|---|---|---|
| WO | WO 2004/063891 A2 | 7/2004 |

* cited by examiner

*Primary Examiner* — Henry Tsai
*Assistant Examiner* — Juanito Borromeo

(57) ABSTRACT

An approach is provided for suggesting data for deletion from an electronic data storage medium. An external device detects initiation of transfer of data from first storage medium to second storage medium. Next, the external device determines an available storage in the second storage medium for the data. Then, the external device generates a list to suggest content for deletion within the second storage medium to accommodate the data.

17 Claims, 10 Drawing Sheets

METHOD AND APPARATUS FOR SUGGESTING DATA FOR DELETION

BACKGROUND

As users become more reliant on electronic devices, electronic storage medium has become a popular method to store information such as documents, music, videos, books, etc. in a form of electronic data. The electronic storage medium is advantageous in that it is relatively inexpensive and can hold a large volume of information while occupying little space. However, because electronic storage media typically have finite storage space, efficient use of storage space is desired. More specifically, for a portable device such as a portable media player, the storage space is relatively small, and thus it is desired to keep the most important data in such limited space. However, because electronic data is not tangible or visible, it is not always easy to locate or manage electronic data stored on such medium. Accordingly, electronic storage media can quickly become cluttered with data that is unwanted or otherwise not used. Browsing and examining every data in the storage medium to delete unnecessary or less important data can be time-consuming and laborious. Therefore, an efficient way to delete data from an electronic storage medium is desired to make efficient use of the storage medium and save time and effort of a user.

SOME EXAMPLE EMBODIMENTS

Therefore, there is a need for an approach for suggesting data for deletion to make efficient use of the storage medium.

According to one embodiment, a method comprises detecting initiation of transfer of data from first storage medium to second storage medium. The method also comprises determining an available storage in the second storage medium for the data. The method further comprises generating a list to suggest content for deletion within the second storage medium to accommodate the data.

According to another embodiment, an apparatus comprising at least one processor, and at least one memory including computer program code, the at least one memory and the computer program code configured to, with the at least one processor, cause, at least in part, the apparatus to detect initiation of transfer of data from first storage medium to second storage medium. The apparatus is also caused to determine an available storage in the second storage medium for the data. The apparatus is further caused to generate a list to suggest content for deletion within the second storage medium to accommodate the data.

According to another embodiment, a computer-readable storage medium carrying one or more sequences of one or more instructions which, when executed by one or more processors, cause, at least in part, an apparatus to detect initiation of transfer of data from first storage medium to second storage medium. The apparatus is also caused to determine an available storage in the second storage medium for the data. The apparatus is further caused to generate a list to suggest content for deletion within the second storage medium to accommodate the data.

According to another embodiment, an apparatus comprises means for detecting initiation of transfer of data from first storage medium to second storage medium. The apparatus also comprises means for determining an available storage in the second storage medium for the data. The apparatus further comprises means for generating a list to suggest content for deletion within the second storage medium to accommodate the data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for suggesting data for deletion are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. In some examples, the data may include media such as music, audio, and video, electronic books, as well as pictures, games, service guide information, presentations, data files, applications, and the like.

Figure 1:
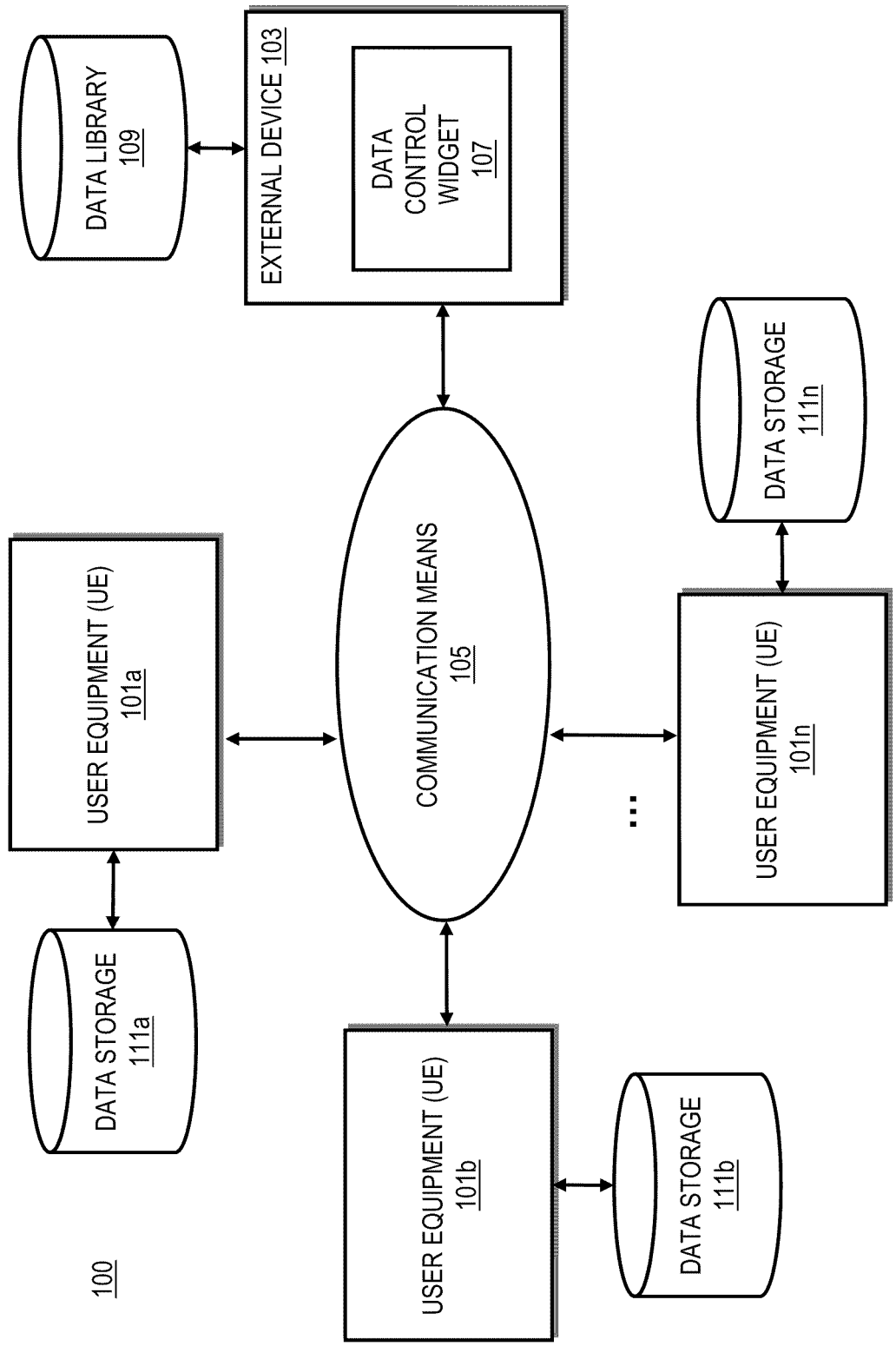
FIG. 1 is a diagram of a system capable of suggesting data for deletion, according to one embodiment.

FIG. 1 is a diagram of a system capable of suggesting data for deletion, according to one embodiment. As electronic devices such as computers and portable devices become more common, people rely on electronic devices significantly in their daily lives. These electronic devices are used in a wide range of activities, including playing music or movies, displaying documents or electronic books, drawing and editing pictures, etc. Further, the electronic devices often include or connect to an electronic storage medium to store electronic data of various forms such as music, movies, photos documents, etc. The electronic storage medium provides a convenient means to store a large amount of data/information. For example, before the discovery of the electronic storage medium, information including documents, pictures, sounds, and videos was kept on paper, compact discs, video tapes and etc, which occupy a lot of space in a large volume. Hence, in the past, a large storage space such as cabinets or even a warehouse building were required to store a large volume of information. The electronic storage medium is advantageous in that it can hold a large volume of information while taking considerably small space. Further, storing data in electronic form allows easy manipulation of data. For example, it is often easier to perform editing, copying and deleting of electronic data than non-electronic data. Furthermore, development of Internet added more advantages to use of the electronic data. For example, transfer of data may be performed easily between two locations, even between very remote locations, over a communication network such as Internet. Users can also share their data, such as music, photos, personal information and etc., with others by posting their data on a server on a communication network. With the widespread use of the electronic devices, people are constantly surrounded by the electronic data storage and constantly dependent on it. For example, people make daily use of computers that have hard drives as electronic data storage, and also use mobile phones or other portable devices such as a portable media player that have electronic data storage media. Further, when people connect to the Internet websites or access an intranet at work, they access servers that store vast amount of information in the form of electronic data, using a communication network.

Despite many advantages, each electronic data storage medium is limited by its capacity. If the electronic data storage medium runs out of space, a user needs to obtain additional electronic data storage medium to store more data. Hence, it is helpful to use an efficient use of the storage medium. In the past, a method has been developed to make an efficient use of data, such data compression to make more space available. However, the data compression method may be cumbersome in that the data needs to be uncompressed if it needs to be accessed. Further, for a device with relatively small electronic data storage capacity such as a portable media player, the storage medium can run out of space more easily and thus it is even more desired to make efficient to use of the storage medium. Additionally, due to the limited space, it may be desirable to store data that the user prefers the most and remove other data that are unused or unwanted. Because the user's preferences may change constantly, it may be desirable to be able to delete and add data to the electronic storage on a regular basis, based on the user's preferences. However, unless the electronic data is organized (e.g. by categories, author, date of creation, etc), it may be difficult to locate the electronic data stored in an electronic data storage medium partially because it is difficult to visualize the electronic data and where it is stored. Hence, it may be difficult to locate an outdated data or any other undesired data and to delete them to make efficient use of the storage medium. For similar reasons, it may be difficult to determine which data to store and which data to delete, and thus the user may accidently delete data that the user intends to keep in the electronic data storage. Even if the electronic data is well-organized, it may still be time-consuming and tedious for the user to browse a large volume of electronic data and try to select the data to delete. Further, during the laborious process of selecting data to delete, the user may easily delete some of the data by mistake. Because deletion of electronic data storage can be performed easily, accidental deletion of electronic data may happen even more easily especially when it is difficult to sort desired data from undesired data.

To address this problem, a system 100 of FIG. 1 introduces the following capabilities: (1) to determine an available storage in a storage medium of a user device, if transfer of data from one storage medium (i.e., a first storage medium) to the storage medium of the user device (i.e., a second storage medium) is requested (2) suggesting content of the user device for deletion within the user device's storage medium to accommodate the data to be transferred, (3) optionally backing up any content suggested or selected for deletion to the first storage medium or another storage medium (i.e., a third storage medium), and (4) deleting the content of the user device based on the suggestion and transferring the data to the user device. More specifically, the system 100 helps the user to select content of the user device to delete in order to make sufficient storage space available for the data to be transferred. In one embodiment, the user may select from the suggested content for deletion to decide which content to delete. The suggestion for deletion is based on various parameters that are used to automatically determine which content of the user device is less desirable to the user. Accordingly, this approach saves time and effort by a user, and also prevents accidental deletion of data, by automatically suggesting content of the user data for deletion. This approach also allows efficient use of the electronic data storage space by suggesting to delete files that may be less desirable to the user.

As shown in FIG. 1, the system 100 comprises a user equipment (UE) 101 having connectivity to the external device 103 via a communication means 105. By way of example, the communication means 105 of system 100 may be any form of means that allow communication between devices. For example, the communication means 105 may be an electrical wire connecting the devices. As another example, the communication means 105 may be a communication network including one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.). The UE 101 also includes or is connected to a data storage medium 111 to store data and/or to access the stored data.

The external device 103 is a device connected to the UE 101 to exchange data via the communication means 105. The external device 103 includes or is connected to a data library 109 to store data and/or access the stored data, wherein the data library 109 is a form of storage medium to store electronic data. For example, data from the data library storage medium may be copied or transferred to the data storage medium 111 of the UE 101 via the communication means 105. Similarly, the data from the data storage medium 11a may also be copied and/or transferred to the data library 109. The external device 103 also includes a data control widget 107 to control various operations including data transfer between devices or storage media. Although not shown in FIG. 1, the UE 101 may also include a type of a widget to control data transfer via the communication means 105.

The UE 101 and the external device 103 may be any type of electronic device that can store electronic data. For example, the external device 103 may be a personal computer with a hard drive as the data library 109. Further, the user equipment 101 may be a portable media player with a memory to store digital media as the data storage medium 111. In another example, the external device may be a server on a network with a large storage medium as the data library 109, wherein the communication means 105 is a communication network, and the UE 101 may be any type of device including a personal computer, a portable device, etc. Further, the data storage 111 may store various types of information including information about the user of the UE 101. The information about the user may include user preferences, a user profile including the user's id, name, birthday etc., as well as a user's tendency or history of accessing data. The data library 109 may include various information about the user(s) connected via the communication means 105.

If the user wants to transfer data from the data library 109 to the UE 101, the user may use the data control widget 107 of the external device 103 to initiate transfer of the data. If there is a sufficient storage space in the data storage medium 111 to accommodate the data to be transferred, then the data is transferred to the data storage medium 111. On the contrary, if there is insufficient storage space in the data storage medium 111, then the data control widget 107 of the external device 103 shows a prompt indicating that there is insufficient storage space. In the prompt, a list of content in the data storage medium 111 is suggested for deletion from the data storage medium 111.

The data control widget 107 in the external device 103 may be a software application that provides visualization (e.g. graphical user interface) to allow a user accessing the external device 103 to perform tasks on the data control widget 107. For example, the data control widget 107 may include an option to select the UEs 101a-101n, wherein one or more of the UEs 101a-101n may be selected for communication. Further, the data control widget 107 may include a window showing a total capacity of data library 109 and/or a total capacity of the data storage medium 111, as well as an available space in the data library 109 and/or an available storage space in the data storage medium 111. The data control widget 107 may also allow the user to make a list of data that the user wants to transfer to another device. For example, if there is a sufficient storage space in the data storage medium 111 to accommodate the data to be transferred, then a user may be provided with an option to transfer the data. On the contrary, if there is insufficient storage space in the data storage medium 111, then the data control widget 107 of the external device 103 shows a prompt indicating that there is insufficient storage space and data in the data storage medium 111 is suggested for deletion to make more free space in the data storage medium 111 to accommodate the data to be transferred. Hence, in the prompt, a list of data files in the data storage medium 111 may be suggested for deletion from the data storage medium 111. The data control widget 107 may allow the user to unselect certain files from the list of the data files suggested for deletion. The data control widget 107 also may allow the user to access and examine the data files or play the data files if they are media files, in order to help the user determine whether or not to unselect the files from the list of the data files suggested for deletion. This is because the user may not recognize the data files by only names of the files, and thus may need to examine the content to determine whether or not to delete the file.

Further, the data control widget 111 may include interfaces that allow the user to communicate with any Internet-based websites. For example, the data control widget 111 may include visual interfaces that accesses Internet to retrieve summary information about certain data files or media files. The data control widget 111 may also include visual interfaces to display information from the data files on the list, such as popularity ratings, access history, size of the file, a time of creation of the file, etc. In addition, the data control widget 111 may also include interfaces to interact with the social network service 107.

The data storage 111 may store various types of information including information about the user of the UE 101 The information about the user may include user preferences, a user profile including the user's id, name, birthday etc., as well as a user's tendency or history of accessing data.

By way of example, the UE 101 and the external device 103 communicate with each other and other components of the communication means 105 using well known, new or still developing protocols. In this context, a protocol includes a set of rules defining how the network nodes within the communication means 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
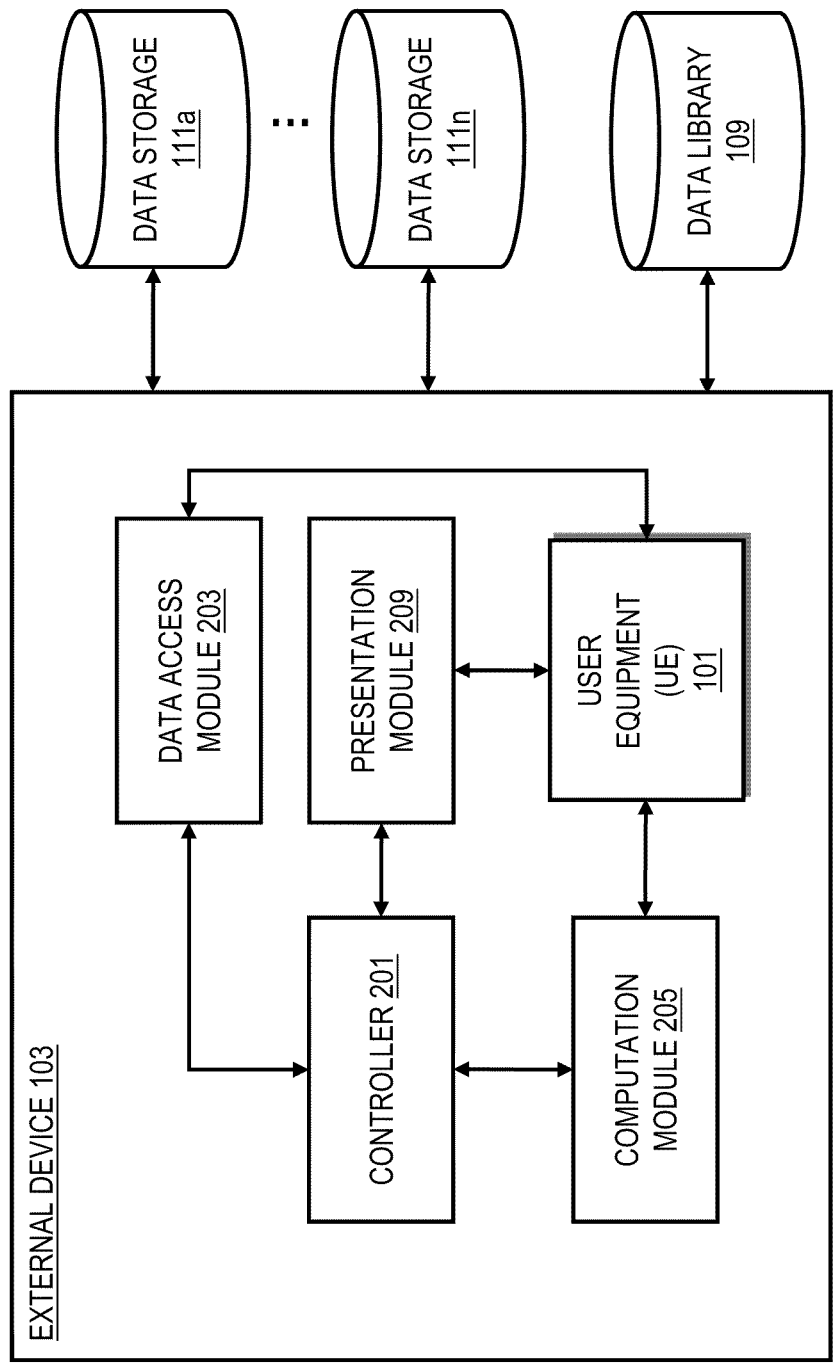
FIG. 2 is a diagram of the components of the external device, according to one embodiment.

FIG. 2 is a diagram of the components of the external device 103, according to one embodiment. By way of example, the external device 103 includes one or more components for suggesting data for deletion. It is contemplated that the functions of these components may be combined in one or more components or performed by other components of equivalent functionality. In this embodiment, the external device 103 includes a controller 201, a data access module 203, a computation module 205 and a presentation module 207. The controller 201 oversees tasks, including tasks performed by the controller 201, the data access module 203, the computation module 205 and the presentation module 207. The data access module manages exchange of data between the UE 101 and the external device 103. The computation module 205 performs various computations and estimations based on given information, including selection of content to suggest for deletion. The presentation module 207 manages information and provides options to choose a presentation of the information in the external device 103 and/or the UE 101, such that the information from the external device 103 and/or the UE 101 can be displayed on the data control widget 107. The external device 103 may also be connected to storage media such as the data library 109 such that the external device can access data in the data library 109 and transfer/copy the data in the data library 109 to another storage medium. The external device 103 may also be connected to the data storage 111 via the communication means 105 such that the external device 103 may be able to control the data in the data storage 111 and/or transfer the data from the data library 109 to the data storage 111.

Figure 3:
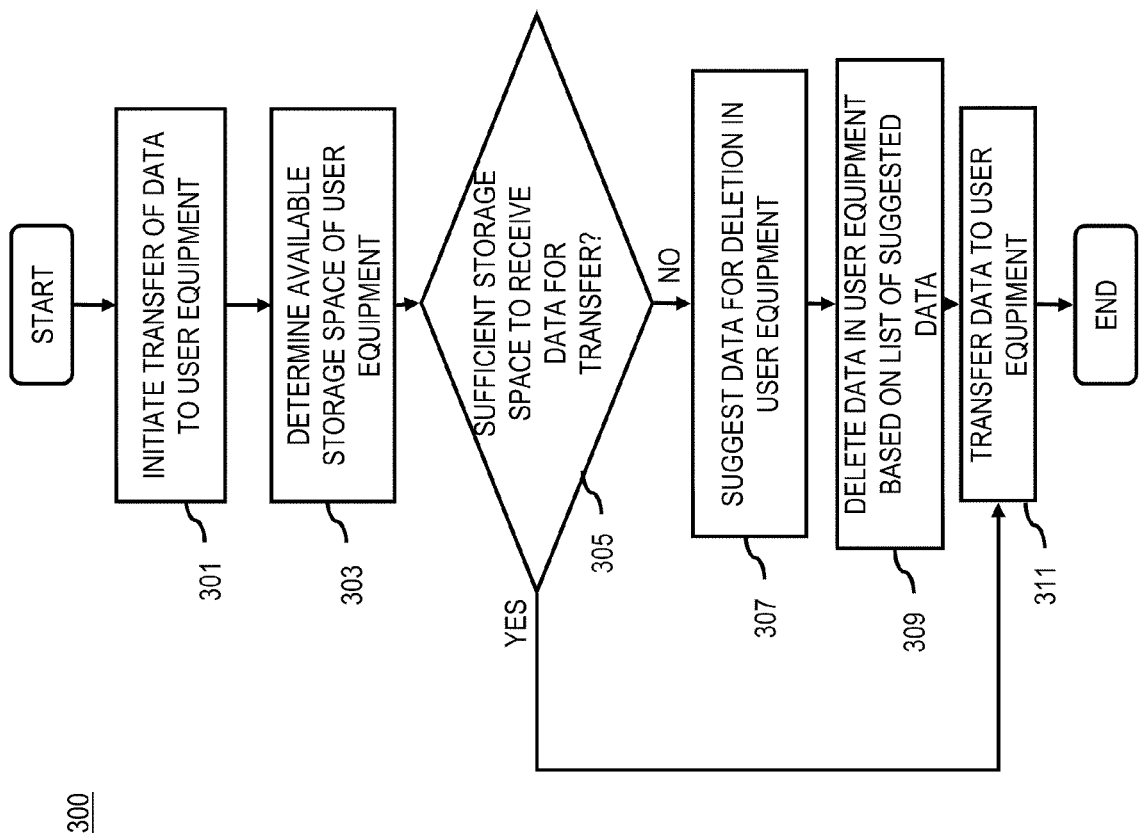
FIG. 3 is a flowchart of a process for suggesting data for deletion, according to one embodiment.

FIG. 3 is a flowchart of a process for suggesting data for deletion, according to one embodiment. In one embodiment, the data control widget 107 performs the process 300 and is implemented in, for instance, a chip set including a processor and a memory as shown FIG. 9. In step 301, a data transfer from the external device 103 to the UE 101 is initiated. The data control widget 107 may include an option to allow the user to initiate the data transfer between the external device 103 and the UE 101. The initiation may also be for a data transfer from the UE 101 to the external device 103 or between the UEs 101a-101n, instead of the data transfer from the external device 103 to the UE 101 shown in this embodiment. Alternatively, the data transfer may be initiated automatically when a certain condition is satisfied (e.g. periodically, new data added to the external device 103, etc). The initiation of the data transfer may be performed in the device having the data to be transferred or in the device that will be receiving the transferred data. In step 303, an amount of available storage space in the data storage medium 111 of the UE 101 is determined. The amount of available storage space in the data storage medium 111 may be displayed via the control data widget 107 along with the total storage space of the data storage medium 111. In step 305, it is determined whether there is sufficient storage space in the data storage medium 111 to accommodate the data to be transferred from the data library 109 of the external device 103. This may be performed by comparing the available storage space of the data storage medium 111 and an amount of the data to be transferred from the external device. If it is determined that there is a sufficient storage space in the data storage medium 111 to accommodate the data to be transferred, then the data is transferred from the data library 109 to the data storage medium 111, as shown in step 311. If there is not a sufficient storage space, then a prompt is generated to automatically suggest data for deletion within the data storage medium 111, as shown in step 307. The prompt may include a list of the suggested data for deletion. Upon user's approval, the suggested data are deleted from the data storage medium 111, as shown in step 309, and the data from the data library 109 is transferred to the data storage medium 111, as shown in step 309. The system can also be configured such that the suggested data are deleted from the data storage medium 111 automatically, without the user's approval. Furthermore, in addition to the automatically suggested data, the user may be allowed browse the data in the data storage medium 111 and manually select the data for deletion.

Additionally, a history of deletion and/or data transfer between the external device 103 and the UE 101 may be kept record to be used as a user preference. The history of deletion and/or data transfer may show user's trend and show which files the user prefers to delete and/or to keep. For example, a data file in the UE 101 that have been previously deleted from the UE 101 ten times may be less preferable than a data file in the UE 101 that has been previously deleted from the UE 101 three times because a user may find that more frequent deletion is equivalent to less importance. Furthermore, before deleting the selected data, a current state of the UE 101 (e.g. a snapshot) may be stored to keep a record of which information was stored in the UE 101 on a certain date. If it is desired later in time to revert back to the state of a certain time, the snapshot information is available to revert the UE 101 to have the data corresponding to the snapshot of the desired time.

Figure 4:
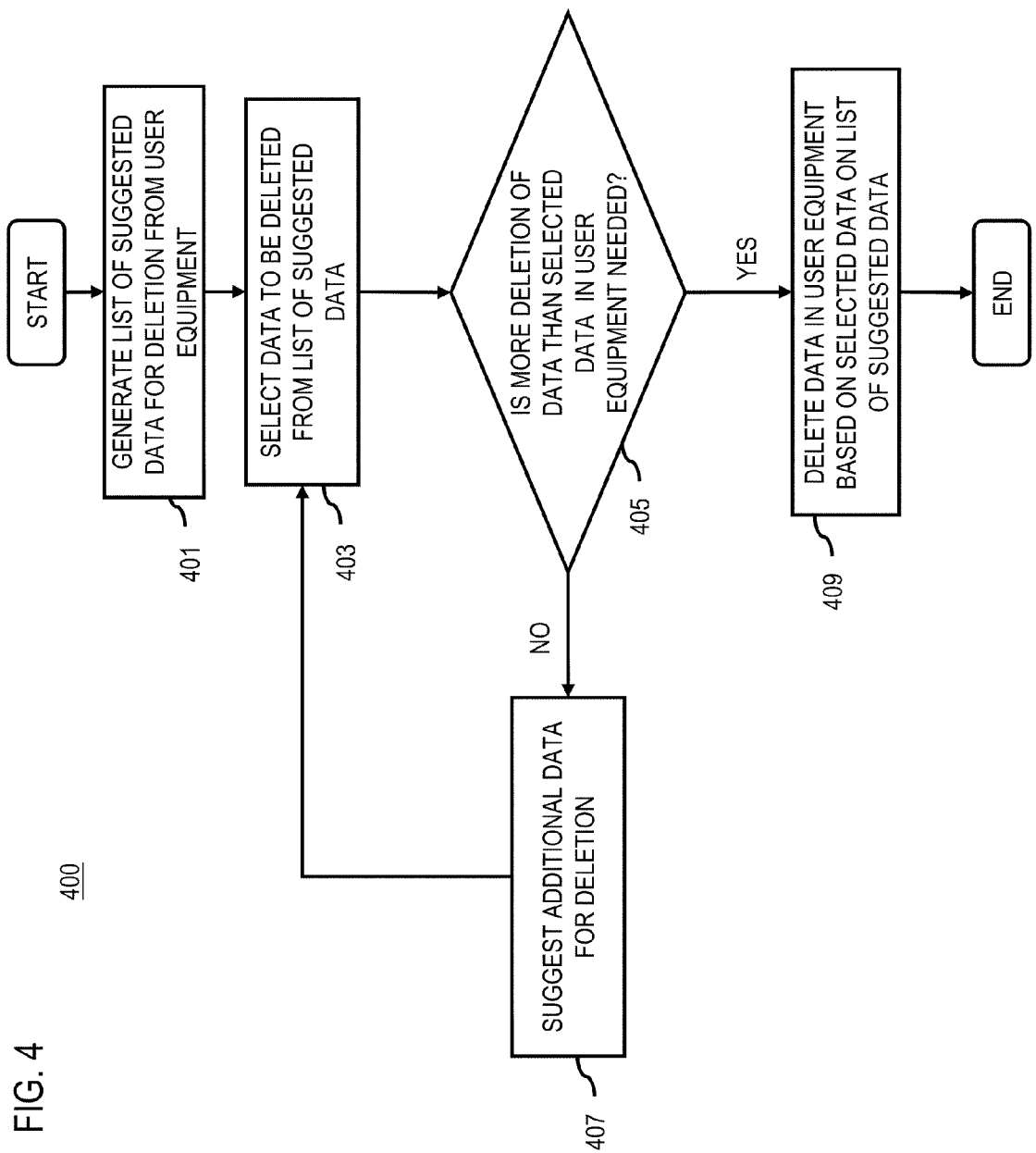
FIG. 4 is a flowchart of a process for suggesting data for deletion, according to one embodiment.

FIG. 4 is a flowchart of a process for suggesting data for deletion, according to one embodiment. In one embodiment, the data control widget 107 performs the process 300 and is implemented in, for instance, a chip set including a processor and a memory as shown FIG. 9. This process may be performed after it is determined that there is insufficient storage space in the data storage medium 111 to accommodate the data to be transferred to the data storage medium 111. In step 401, a prompt is generated showing a list of suggested data for deletion from the data storage medium 111. The prompt may show information such as an amount of data to be transferred, and an amount of free space in the data storage medium 111. As shown in step 403, data is selected for deletion from the list of the suggested data. When the prompt is generated, the prompt may also have options that the user can choose to select or unselect data from the list of the suggested data. Then, from the list of the suggested data, the user may select data to delete or unselect the data to keep within the data storage medium. After the data is selected for deletion from the list of the suggested data, it is determined whether more deletion of data than the selected data is necessary in the data storage medium 111 in order to accommodate the data to be transferred to the data storage medium 111, as shown in step 405. If more data needs to be deleted to accommodate the data to be transferred, then additional data is suggested for deletion, as shown in 407. Then, the data is again selected for deletion based on the suggested data. If sufficient data is selected for deletion to accommodate the data to be transferred, then the data of the data storage medium 111 is deleted based on the suggested data, as shown in step 409. The deletion of the data taken place in step 409 makes sufficient space available in the data storage medium 111 to accommodate the data to be transferred.

The suggested data for deletion may be automatically suggested based on various parameters including categories, a size of the data file, a frequency of access of the data, a frequency of access of the data based on category, a time of most recent access of the data, etc. These parameters may be configured based on user's preferences. In a case where a user may prefer certain categories than other categories, a user may number or rank the categories in the order of the user's preferences, and the data files belonging to the least desired categories are suggested for deletion. Further, a user may prefer to keep smaller data files than larger data files, because the user can keep more of smaller data files than larger data files in the data storage medium 111. Further, a history of accessing the data may be kept record, and be used as a parameter to suggest files for deletion. For example, based on the history of data access, the frequency of data access (e.g. how frequent each data is accessed or how frequent each media file is played) may be kept record. Then, data for deletion may be suggested based on the history of data access. It may be configured such that the least frequently accessed data are suggested for deletion because a user may not consider these files to be less important to the user. In contrast, it may be configured such that the most frequently accessed data are suggested for deletion because a user may consider these files to be the files that the user has enough access. For example, the user may consider the most played music files to be the music files that the user does not find interesting because the user has already listened to them enough. Further, each data may belong to one of various categories, and the data may be suggested for deletion based on the most frequent accessed category or the least frequent accessed category. In addition, a most recent time each data is accessed may be kept record, and be used as a parameter to determine the user's preference for the data. For example, a user may not access a data file for a long time because the user no longer finds the file useful or the data file is outdated and the user forgot about the existence of the data file. In this case, the user considers the file accessed a long time ago as a less desired data file. Further, these parameters may be automatically configured based on the user's preferences in deletion of the files, based on the history of deletion of the files.

Further, the suggested data for deletion may be automatically suggested based parameters with information retrieved from the Internet. For example, popularity ratings of content of the data (e.g. popularity rating of a song) may be retrieved from the Internet, and the data may be suggested for deletion based on the popularity ratings. Much information about the data may be retrieved from the Internet, such as the release date of a book, an average critic's rating of a movie, album information of music, a date of an event referred by a digital newspaper, etc. These various parameters that can be retrieved both locally and from the Internet may be considered individually or in combination to suggest data for deletion. Thus, by automatically suggesting data for deletion, this system allows fast deletion of undesired data from a storage medium. This is particular advantageous for a portable media player with smaller storage space, wherein undesired data in the portable media player are automatically suggested for deletion, to make more space for additional data from a personal computer connected to the media player. Further, as another example, a user may want to archive the user's media collection more efficiently in a large storage medium connected to the user's personal computer, and may want to delete data in the large storage medium that the user no longer finds desirable. The automatic suggestion of data for deletion makes this media archiving easy so that the storage space is used efficiently.

Figure 5:
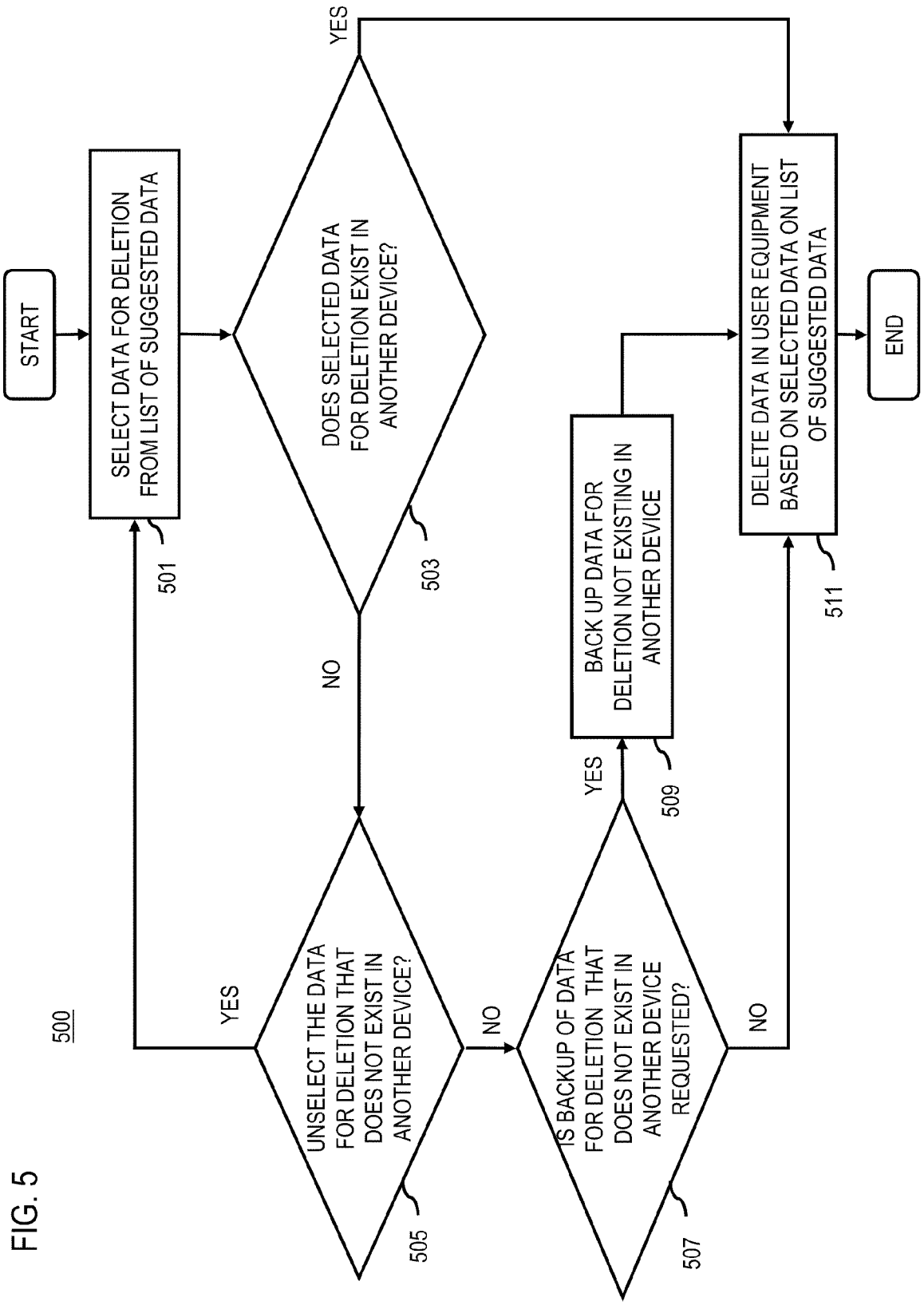
FIG. 5 is a flowchart of a process for suggesting data for deletion, according to one embodiment.

FIG. 5 is a flowchart of a process for suggesting data for deletion, according to one embodiment. In one embodiment, the data control widget 107 performs the process 300 and is implemented in, for instance, a chip set including a processor and a memory as shown FIG. 9. After selecting data to be deleted from the suggested data for deletion from the data storage medium 111 of the UE 101, for example, as shown in step 501, it is determined in step 503 whether the selected data exists in another device or storage medium other than the device or the storage medium where the selected data is being deleted. If it is determined that the selected data exists in another device or storage medium, then the selected data is deleted from the data storage medium 111 of the UE 101, as shown in step 511. If it is determined that the selected data does not exist in another device or storage medium, then an option is shown to allow the user to unselect such selected data, as shown in step 505. One purpose of this option is to prevent the user from deleting the data without having any other copies of the data available, in case the user wants to have an access to the data later. If the user does not unselect the data that does not exist in another device, then an option allowing the user to select whether such selected data needs to be backed up (i.e. a copy is stored in another location), as shown in Step 507. Alternatively, the backup of the data may also be performed automatically, without the user choosing the option. If the backup of the data is requested, then the back up is performed in another location other than the storage medium where the selected data is being deleted, as shown in step 509, and then the selected data is deleted from the data storage medium 111 of the UE 101, as shown in step 511. An additional option may be available to the user to select a location to store the backup data. An electronic data storage medium may be damaged by a prolonged usage or any external circumstances such as electromagnetic interference or electrical surge. Thus, this feature of the invention also provides an advantage in that it provides an option to back up the electronic data in the data library 109 or another electronic storage medium (i.e. the third storage medium) by making duplicate copies.

Figure 6A:
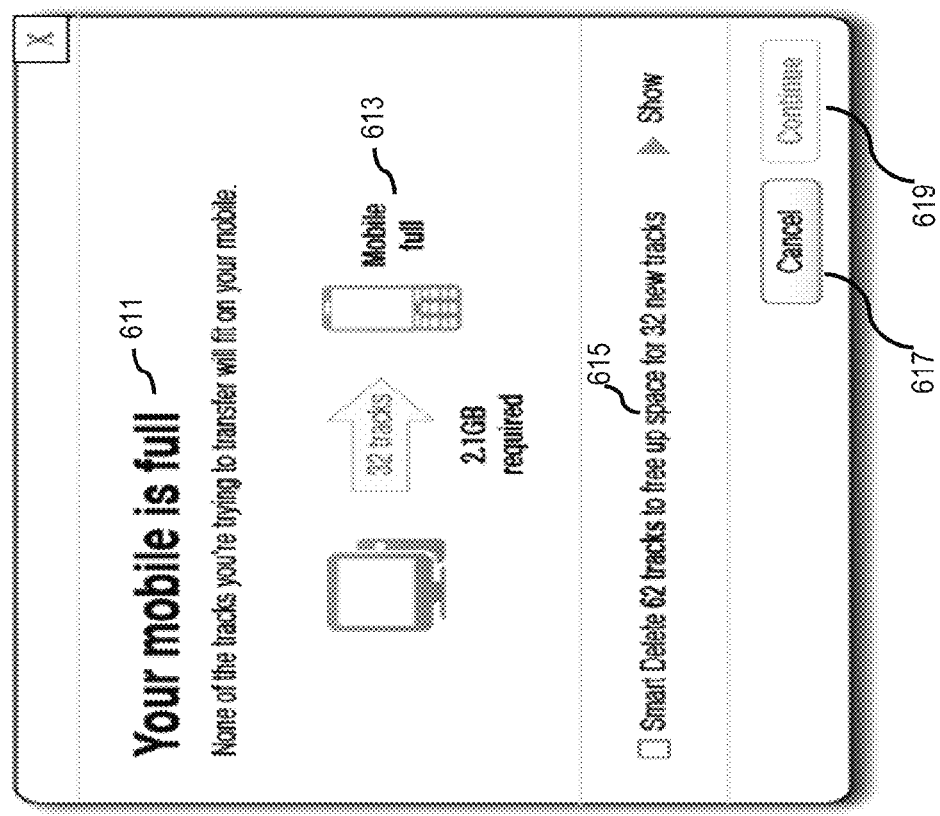
FIGS. 6A-6B are diagrams of user interfaces utilized in the processes of FIG. 3, according to various embodiments.
Figure 6B:
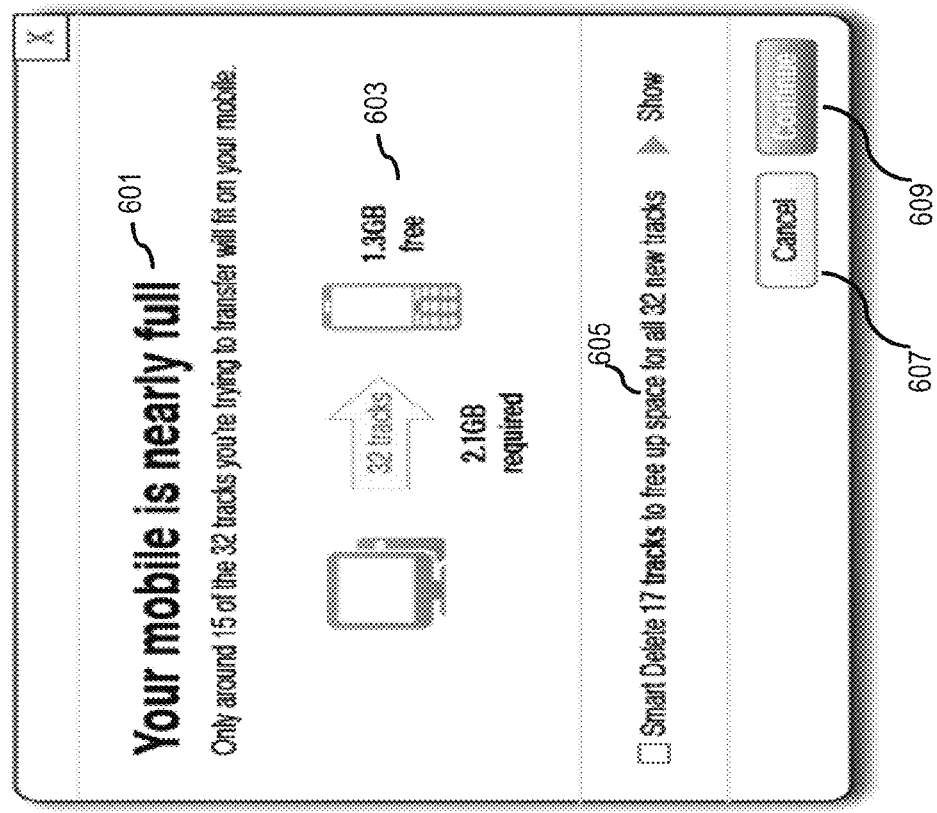

FIGS. 6A-6B are diagrams of user interfaces utilized in the processes of FIG. 3, according to various embodiments. In this particular example, data is to be transferred from a personal computer as the external device 103 to a mobile device as the UE 101. The user interfaces shown in FIGS. 6A-6B may be used by the data control widget 107. FIG. 6A shows a user interface used by the data control widget 107, wherein the data storage medium 111 has some free space but is not sufficient to accommodate the entire data to be transferred. In this example, the interface displays the message "Your mobile is nearly full", and displays an estimated amount of data that can be transferred, as shown in 601. For example, as shown in FIG. 6A, the message will display that only 15 of the 32 tracks you're trying to transfer will fit on your mobile. The user interface may also show an amount of free space required in the mobile device (e.g. 2.1 GB) and an amount of free space currently available in the mobile device (e.g. 1.3 GB) as shown in 603. Further, the user interface may suggest an amount of data to be deleted from the mobile device and include an option to display the suggested data for deletion, as shown in 605. The user interface also provides a "cancel" option 607 and a "continue" option 609 to allow the user to determine whether to proceed with the transfer of the data. If the "continue" option is selected without further deleting data in the mobile device, then only 15 of the 32 tracks will be transferred to the mobile device.

FIG. 6B shows a user interface, wherein the data storage medium 111 has no free space available. In this example, the interface displays the message "Your mobile is full," and displays that no data can be transferred to the mobile device, as shown in 611. Further, the user interface may display an amount of free space required in the mobile device (e.g. 2.1 GB), but also indicate that the storage space in the mobile device is full, as shown in 613. The user interface further may display an amount of data to be deleted from the mobile device, and include an option to show the suggested data for deletion, as shown in 615. The user interface also provides a "cancel" option. However, in this example, although the "continue" option 619 is shown in the user interface, it cannot be selected because data needs to be deleted to free more space in the mobile device for transfer of the data from the personal computer.

Figure 7:
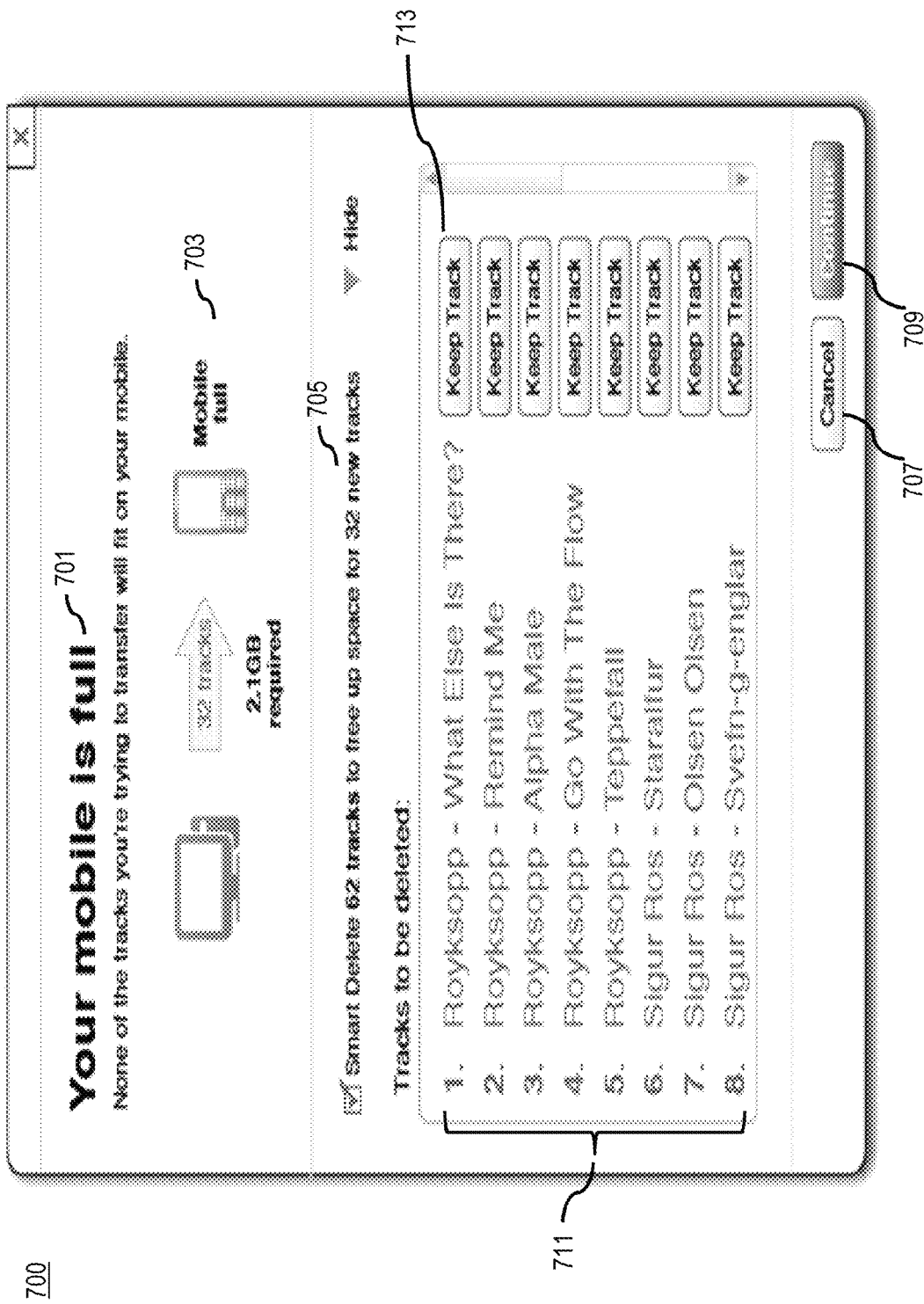
FIG. 7 is a diagram of user interfaces utilized in the processes of FIG. 4, according to one embodiment.

FIG. 7 is a diagram of user interfaces utilized in the processes of FIG. 4, according to one embodiment. The user interface in this example is similar to the user interface shown in FIGS. 7A and 7B. Thus, the user interface in this example displays a message showing that the mobile device is full or nearly full, as shown in 701, and displays an amount of free space required in the mobile device and an amount of free space available in the mobile device, as shown in 703. The smart delete feature may be selected, as shown in 705, and a list of the suggested data for deletion may be shown in an expandable window, as shown in 711. An option (e.g. "Keep Track") to unselect from the list of suggested data for deletion may be shown next to each data file suggested for deletion, as shown in 713. If the option "Keep Track" is selected, then the corresponding data with the "Keep Track" option selected will be kept in the mobile device, whereas other data will be deleted from the mobile device when the smart delete process begins. Similar to the example shown in FIGS. 5A and 5B, the smart delete can be canceled using the "cancel" option 707 or be processed using the "continue" option 709.

The processes described herein for suggesting data for deletion may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
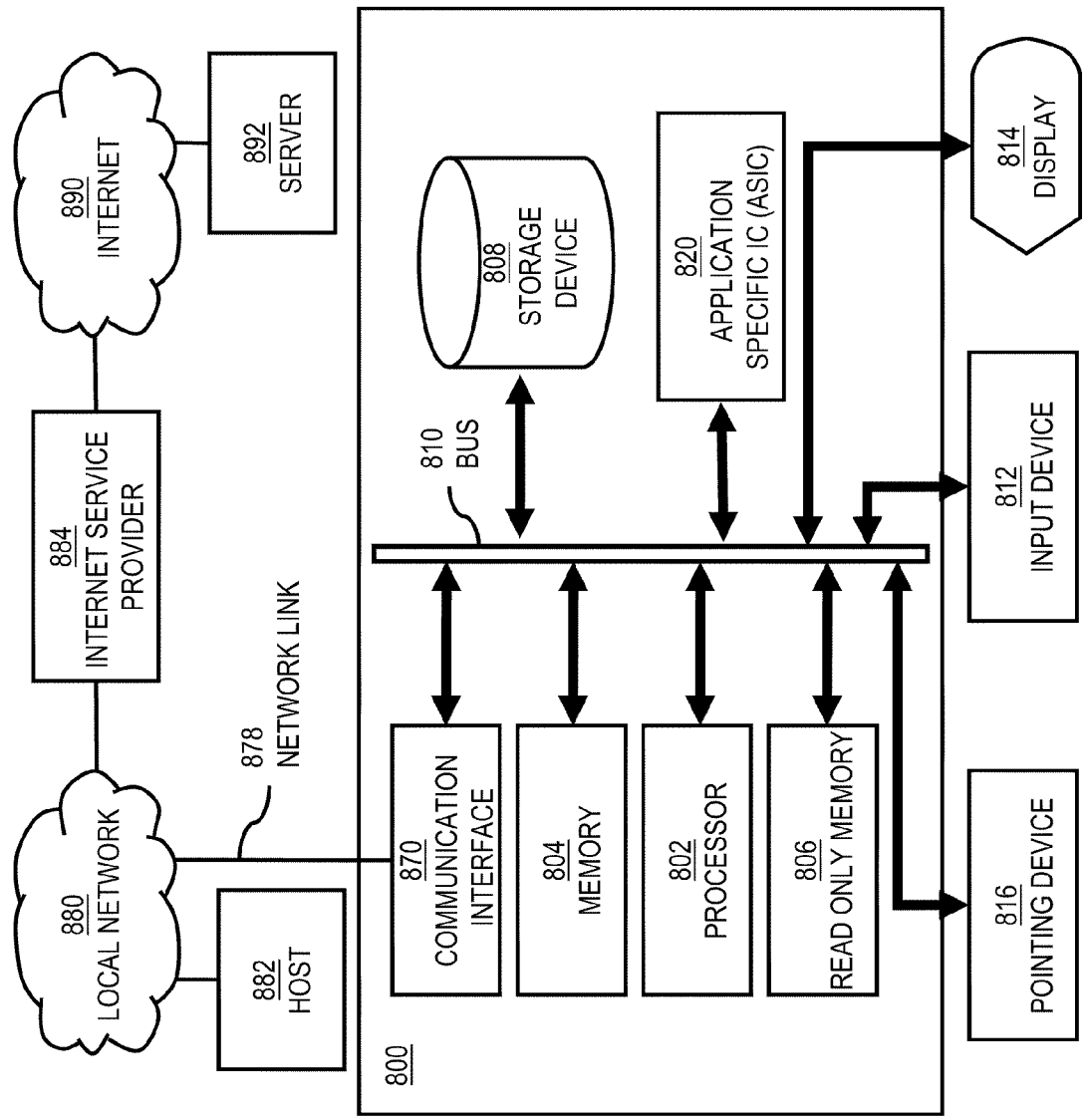
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to suggest data for deletion as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of suggesting data for deletion.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to suggest data for deletion. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for suggesting data for deletion. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for suggesting data for deletion, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication means 105 for suggesting data for deletion to the UE 101.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
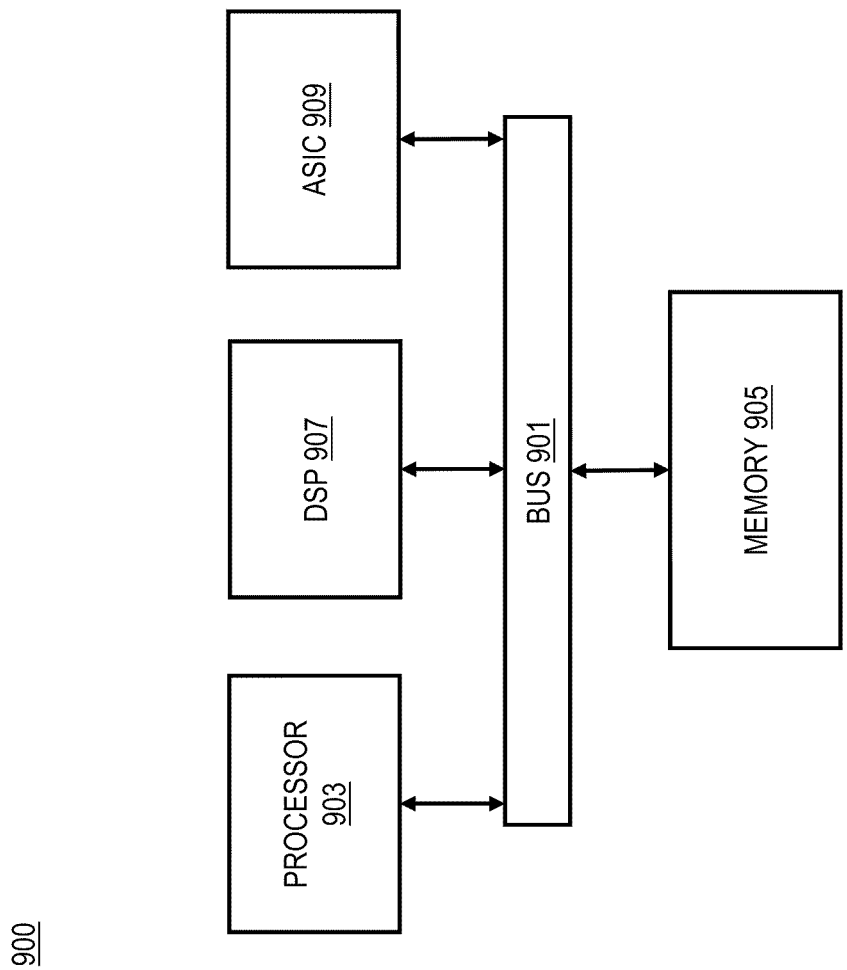
FIG. 9 is a diagram of a chip set that can be used to implement an embodiment of the invention.

FIG. 9 illustrates a chip set 900 upon which an embodiment of the invention may be implemented. Chip set 900 is programmed to suggest data for deletion as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of suggesting data for deletion.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to suggesting data for deletion. The memory 905 also stores the data associated with or generated by the execution of the inventive steps.

Figure 10:
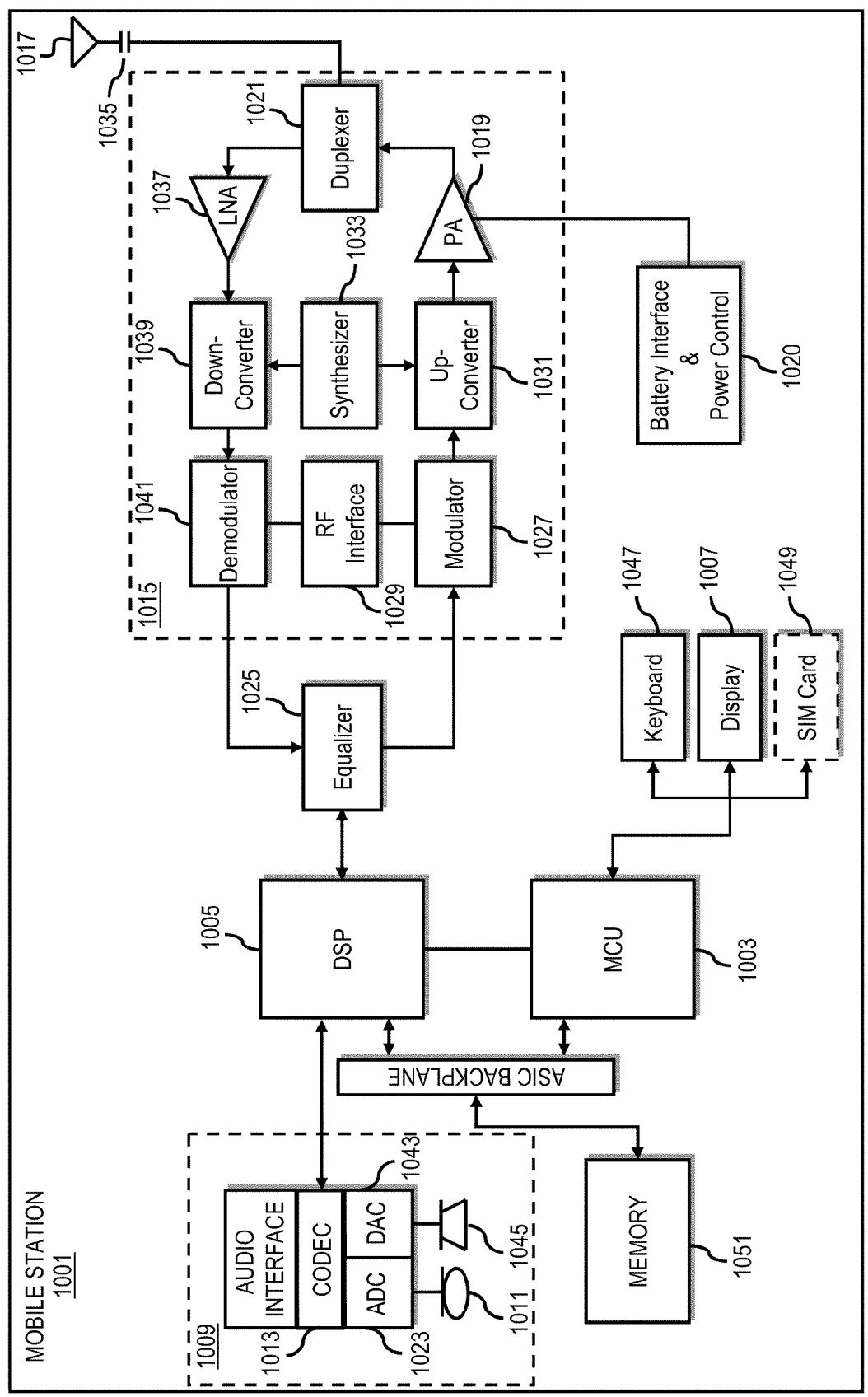
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of suggesting data for deletion. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of suggesting data for deletion. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to suggest data for deletion. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting initiation of transfer of data from a first storage medium to a second storage medium, the second storage medium storing a plurality of data files;
   determining an available storage in the second storage medium;
   generating, based on one or more predefined parameters, a list comprising one or more of the plurality of data files for deletion within the second storage medium such that the available storage in the second storage medium is sufficient to accommodate the data;
   displaying the list to a user;
   receiving an input from the user selecting one or more of the plurality of data files of the list for deletion;
   causing, at least in part, deletion of the selected data files from the second storage medium; and
   causing, at least in part and in response to causing deletion of the selected data files, transfer of the data from the first storage medium to the second storage medium.

2. A method of claim 1, further comprising:
   suggesting additional content for deletion if more deletion of content than the selected data in the second storage medium is needed to accommodate the data from the first storage.

3. A method of claim 1, wherein the list of the suggested content for deletion is generated based on one or more parameters including a size of a data file, a frequency of access of a data file, a frequency of access of a category of a data file, a time of a most recent access of a data, and a popularity rating of a data file.

4. A method of claim 1, further comprising:
   causing, at least in part, transfer of the selected data from the second storage medium to a third storage medium.

5. A method of claim 1, further comprising:
   if the first storage medium does not have the selected data, storing in the first storage medium the selected data that does not exist in the first storage medium.

6. A method of claim 1, wherein a history of deletion of the selected data and transfer of the data to be transferred is stored to show a pattern of data transfer between the first storage medium and the second storage medium.

7. A method of claim 1, further comprising:
recording a snapshot information of the second storage medium before deleting the selected data to be deleted, wherein the snapshot information includes information about the data existing at a time of recording of the snapshot information so as to allow reverting back to a state at the time of recording of the snapshot information.

8. An apparatus comprising:
at least one processor; and
at least one memory including computer program code, the at least one memory and the computer program code configured to, with the at least one processor, cause the apparatus to perform at least the following,
detect initiation of transfer of data from a first storage medium to a second storage medium, the second storage medium storing a plurality of data files;
determine an available storage in the second storage medium;
generate, based on one or more predefined parameters, a list comprising one or more of the plurality of data files for deletion within the second storage medium such that the available storage in the second storage medium is sufficient to accommodate the data;
display the list to a user;
receive an input from the user selecting one or more of the plurality of data files of the list for deletion;
cause, at least in part, deletion of the selected data files from the second storage medium; and
causing, at least in part and in response to causing deletion of the selected data files, transfer of the data from the first storage medium to the second storage medium.

9. An apparatus of claim 8, wherein the apparatus is further caused to:
suggest additional content for deletion if more deletion of content than the selected data in the second storage medium is needed to accommodate the data from the first storage.

10. An apparatus of claim 8, wherein the list of the suggested content for deletion is generated based on one or more parameters including a size of a data file, a frequency of access of a data file, a frequency of access of a category of a data file, a time of a most recent access of a data, and a popularity rating of a data file.

11. An apparatus of claim 8, wherein the apparatus is further caused to:
cause, at least in part, transfer of the selected data from the second storage medium to a third storage medium.

12. An apparatus of claim 8, wherein the apparatus is further caused to:
if the first storage medium does not have the selected data, store in the first storage medium the selected data that does not exist in the first storage medium.

13. An apparatus of claim 8, wherein a history of deletion of the selected data and transfer of the data to be transferred is stored to show a pattern of data transfer between the first storage medium and the second storage medium.

14. An apparatus of claim 8, wherein the apparatus is further caused to:
record a snap shot information of the second storage medium before deleting the selected data to be deleted, wherein the snap shot information includes information about the data existing at a time of recording of the snapshot information so as to allow reverting back to a state at the time of recording of the snapshot information.

15. A non-transitory computer-readable storage medium carrying one or more sequences of one or more instructions which, when executed by one or more processors, cause an apparatus to at least perform the following steps:
detecting initiation of transfer of data from a first storage medium to a second storage medium, the second storage medium storing a plurality of data files;
determining an available storage in the second storage medium;
generating, based on one or more predefined parameters, a list comprising one or more of the plurality of data files for deletion within the second storage medium such that the available storage in the second storage medium is sufficient to accommodate the data;
displaying the list to a user;
receiving an input from the user selecting one or more of the plurality of data files of the list for deletion;
causing, at least in part and in response to receiving the input from the user, deletion of the selected data files from the second storage medium; and
causing, at least in part and in response to causing deletion of the selected data files, transfer of the data from the first storage medium to the second storage medium.

16. A non-transitory computer-readable storage medium of claim 15, wherein the list of the suggested content for deletion is generated based on one or more parameters including a size of a data file, a frequency of access of a data file, a frequency of access of a category of a data file, a time of a most recent access of a data, and a popularity rating of a data file.

17. A method of claim 1, further comprising:
presenting the generated list to the user for optional modification prior to deletion of suggested content.

* * * * *